United States Patent [19]

Douglas et al.

[11] Patent Number: 4,710,815

[45] Date of Patent: Dec. 1, 1987

[54] APPARATUS FOR IMPROVING THE LINEARITY OF TV TRANSMITTERS USING A KLYSTRON

[75] Inventors: Peter G. Douglas, Chandler's Ford; Morris N. Kyffin, Andover, both of England

[73] Assignee: Independent Broadcasting Authority, London, United Kingdom

[21] Appl. No.: 698,584

[22] Filed: Feb. 5, 1985

[30] Foreign Application Priority Data

Feb. 6, 1984 [GB] United Kingdom ................. 8403067

[51] Int. Cl.$^4$ ........................... H04N 5/38; H04B 1/04
[52] U.S. Cl. ..................................... 358/186; 358/174; 455/91; 455/108
[58] Field of Search ....................... 358/186, 187, 174; 455/91, 108, 106, 113, 114, 126

[56] References Cited

U.S. PATENT DOCUMENTS

| | | | |
|---|---|---|---|
| 4,204,229 | 5/1980 | Heuze | 358/174 |
| 4,392,245 | 7/1983 | Mitama | 455/116 |
| 4,470,068 | 9/1984 | Plume | 358/186 |
| 4,535,361 | 8/1985 | Corbel | 358/174 |

Primary Examiner—Tommy P. Chin
Attorney, Agent, or Firm—Watson Cole et al.

[57] ABSTRACT

A broadcast signal transmitter utilizes a klystron and a transmitter amplifier (10) operating in a pulsed mode. Two feedback loops are provided for controlling the output of the amplifier (10). A first feedback loop includes a control circuit (14) for providing automatic gain control of the black level of a vision signal to be transmitted while the second feedback loop includes a further control circuit (18) for improving the linearity of the transmitter. The first feedback loop output control signal at line rate while the second feedback loop output signals at first rate, both being operative during the period when an insertion test signal (I.T.S.) is supplied to the transmitter.

4 Claims, 3 Drawing Figures

APPARATUS FOR IMPROVING THE LINEARITY OF TV TRANSMITTERS USING A KLYSTRON

BACKGROUND OF THE INVENTION

1. Field of the Invention

The present invention relates to broadcast signal transmitters and more particularly to a transmitter which utilizes a klystron.

2. Description of Related Art

A new klystron has become available which enables the transmitter amplifier to work in a pulsed mode in order to improve the efficiency of the transmitter. Tests with such a klystron have been undertaken to study its stability of operation both in the short term and the long term. As far as video parameters are concerned, the klystron appears generally stable with the exception that the linearity parameters represented by L.F. non-linearity and H.F. differential gain exhibit gross variations in the short term (daily variations) and in the long term as represented by the stability of parameter values achieved at the end of each day's operation.

An analysis of the results of the tests has shown that large variations in linearity characteristics are suffered when investigating the drive for the klystron. This was felt to indicate a high degree of dependence between imposed linearity correction and the temperature of operation of the I.F. drive circuits.

It was considered that the linearity problems with the klystron in pulsed mode could be overcome by utilizing improving the drive stability e.g. by making use of a specialised drive circuit specially designed for pulsed mode operation of the klystron. This, however, is an expensive solution.

SUMMARY OF THE INVENTION

The present invention provides a feedback loop in addition to the usual feedback loop in which a measurement of linearity is used to derive an error signal which alters the drive level in such a way that the linearity corrector setting is optimized.

BRIEF DESCRIPTION OF THE DRAWINGS

Features and advantages of the present invention will become apparent from the following description of an embodiment thereof given by way of example with reference to the accompanying drawings, in which.

DETAILED DESCRIPTION OF A PREFERRED EMBODIMENT

Figure 1:
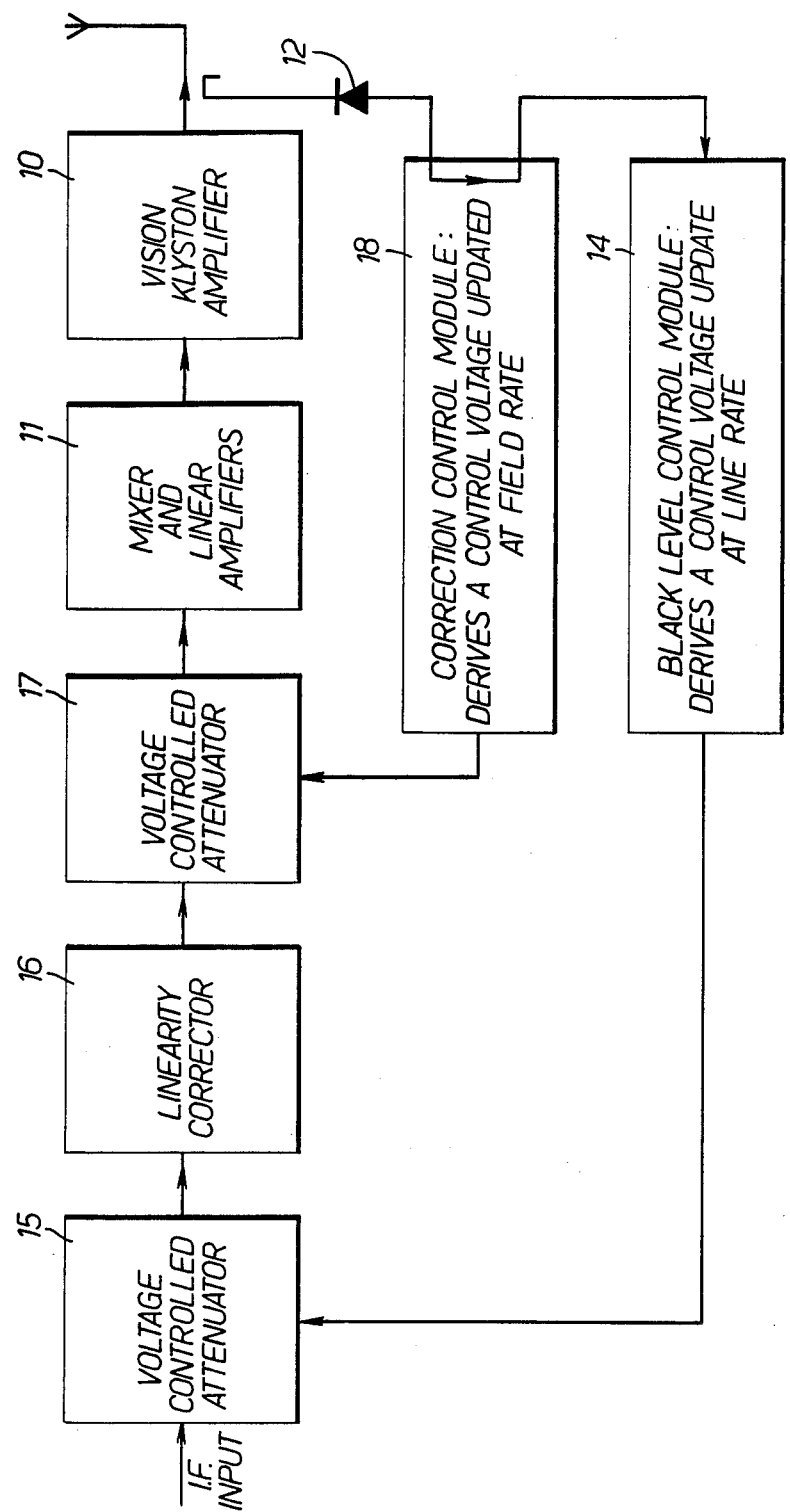
FIG. 1 shows a block diagram of a transmitter employing a klystron amplifier according to the present invention.

FIG. 1 shows a block diagram of a U.H.F. transmitter employing klystron operating in the pulse mode in which the beam current is raised during the period and reduced during the active picture time of a television signal. A klystron amplifier 10 which comprises preferably a Valvo Y K1233 klystron receives signals for transmission from a mixer and linear amplifier circuiting 11. Automatic gain control of the black level of the vision signal is provided by feeding back a portion of the output of the amplifier 10 derived by a diode detector 12 through a control module 14. The output from the module 14 controls a voltage controlled attenuator 15 in order to vary an I.F. input signal to the transmitter. The output from the attenuator 15 is fed through a linearity correction circuit 16 which, in a conventional system would feed the mixer and linear amplifier circuitry 11.

In the present invention, the attenuator 15, preferably a pin diode attenuator is controlled by a feedback voltage updated a line frequency rate to maintain the transmitted signal black level at a constant power. A further voltage controlled attenuator 17 is provided at the input to the mixer and linear amplifier circuitry 11 and is controlled by a correction control module 18 which outputs a feedback voltage derived from the diode detector 12, which feedback voltage is updated at field frequency rate.

Preferably, the feedback voltage produced by the correction control module 18 is adjusted by measurements made in the I.T.S. signal e.g. during lines 19 and 332. A change in this feedback voltage will either reduce the system gain forcing the attenuator 15 to input a higher level to the linearity corrector 16, thus increasing the relative gain at black level, or increase the system gain with the opposite effect.

Figure 2:
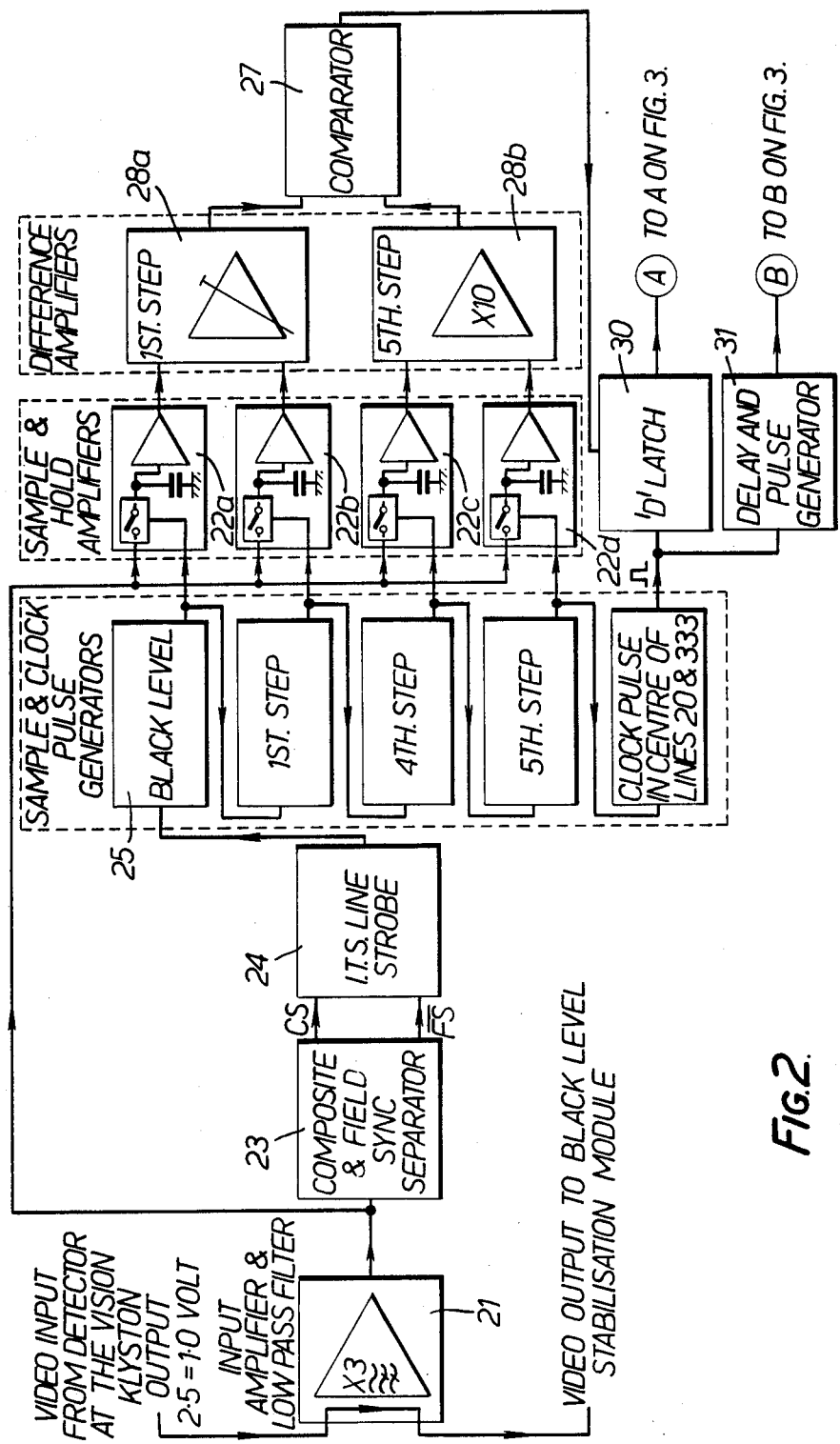
FIGS. 2 and 3 together show a circuit diagram of a part of the transmitter shown in FIG. 1.

The construction of the correction control module will now be described in more detail with reference to FIGS. 2 and 3.

A video signal from the diode detector 12 at the klystron amplifier 10 output, which normally feeds the black level power control module 14, is looped through a field rate a.g.c. unit. This video signal is amplified by a factor of three in the input amplifier and low pass filter 21. The chrominance subcarrier is also removed at this point.

The amplifier video is fed to sample and hold amplifiers 22a–22d and to a sync pulse separator 23 which generates composite sync pulses and inverted field sync pulses. These are then passed to an ITS line counter 24 which strobes the sync pulses corresponding to lines 19 and 332 which contain the five riser staircase which is to be sampled to generate the control signal.

The ITS line strobe is fed to a cascaded unit 25 which generates sampling pulses at black level approximately 3 microseconds before the first step riser, in the centre of the first step, the centre of the fourth step, the centre of the fifth step and in the centre of the ensuing line. The first four pulses are fed to the sampling and hold amplifiers 22a–22d, the fifth pulse is used as described later to latch the status of a comparator 27. The sample and hold amplifiers 22a–22d store the voltage levels corresponding to black level, first step, fourth step and fifth step. These are fed in pairs to differential amplifiers 28a, 28b which generate output voltages suitably amplified, which are proportional to the riser amplitudes of the first and fifth steps. The first step difference amplifier 28a is adjustable in gain, in alignment this gain control allows correction to be made to any relative gain position between first and fifth steps in the range +20% to −20%. The outputs of the differential amplifiers 28a, 28b are fed to the comparator 27 which is a low hysterisis comparator. The output of this comparator goes to a high logic level when the first step exceeds the fifth step or low in the reverse condition. At this point a decision has been made as to whether the transmitter system requires less or more correction as represented by respective logic levels of '1' and '0'.

The comparator output is fed to the 'DATA' input of a 'D' type latch 30, this information is transferred to the 'Q' output of the latch by the clock pulse at the centre of the following line. This clock pulse is also fed to a delay unit and pulse generator 31 which generates a further pulse after allowance for settlement of the Q output from the latch 30.

Figure 3:
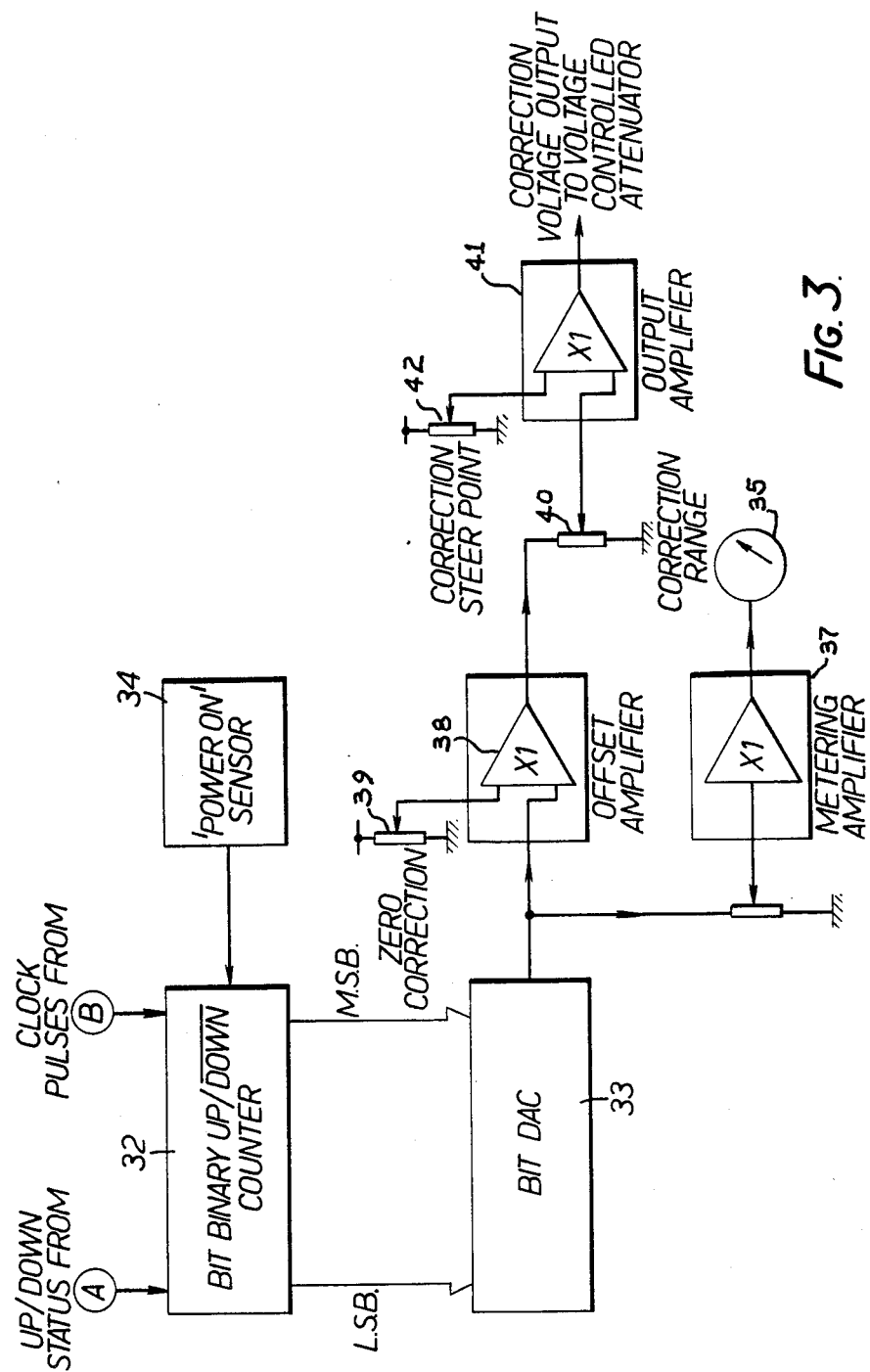

The clock pulse and latch 'Q' output are fed to an eight bit binary counter 32 shown in FIG. 3. The latch 30 output controls the UP/DOWN status of the counter. If the latch 30 output is high, the counter 32 binary output increases by one with each clock pulse, if the latch output is low the counter output decreases by one with each applied clock pulse.

The output of the binary counter 32 feeds a high precision 8 bit digital to analogue converter 33 deriving at its output an analogue voltage proportional to the binary counter 32 output value.

This analogue voltage increases by a small amount in each field if the transmitter is over-corrected or conversely decreases by an equal amount in each field if the transmitter is undercorrected.

The fluctuations in the analog voltage are displayed on meter 35. The analog voltage is applied to one end of a potential divider 36, the other end of which is grounded and a fraction of the analog voltage is tapped off via metering amplifier 37 to the meter 35.

The zero of the analog voltage is corrected using offset amplifier 38. The output from 8-bit DAC 33 forms one input to the offset amplifier 38, the other input being a set voltage tapped off from a potential divider 39. Since the gain of the offset amplifier 38 is unity, the amplifier output corresponds to the analog voltage output from DAC 33 shifted in level in accordance with the setting of potential divider 39.

The control voltage output from the autocorrection control module is generated from the zero-corrected analog voltage using a steering circuit arrangement (40, 41, 42). The zero-corrected analog voltage is applied to potential divider 40, one end of which is grounded. A fraction of the corrected analog voltage is tapped off from the potential divider 40 to form one input to an output amplifier 41. The setting of the potential divider 40 defines the size of the range of generated control voltages to be output from the correction control module 18. The other input to the output amplifier 41 is a steering voltage tapped off from potential divider 42. The setting of potential divider 42 defines the range of positive and/or negative values which the control voltage may take. The control voltage output from the output amplifier 41 indicates the difference between the steering voltage and a set fraction of the corrected analog voltage.

The control voltage thus derived is fed to the pin diode attenuator 17, positioned after the linearity corrector 16, thus adjusting the level of intermediate frequency signal passed by the corrector 16 to meet the needs of good linearity performance.

A power-on sensor 34 is connected to the up/down counter 32 so that should mains failure occur, the correction system adopts a mid-range attitude on mains restoration.

The response time in correction of changes in linearity is fast enough to compensate the maximum rate of change presented by an uncorrected system. Further, the system is only active when the ITS signal is present. During periods of ITS signal absence, the condition of correction established before loss of the ITS signal is maintained until its restoration, with the exception of information loss by mains failure.

The system accommodates spurious distortions to ITS signals. Any corrective action taken following such distortions does not result in unacceptable picture quality during the ensuing picture field.

The system has the advantage that it can be applied with beneficial results where scrambling of the television signal is used. The linearity correction is particularly effective within a line inversion type of scrambling.

We claim:

1. A transmitter apparatus comprising a klystron circuit having an input and output, input signal conditioning circuitry having an input for signals to be transmitted and an output connected to the input of said klystron circuit for inputting conditioning signals thereto, a detector for detecting a modulating signal at the output of said klystron circuit and producing an output representative thereof, and a feedback circuit including a control circuit having an input connected to said detector, and an output connected to said input signal conditioning circuitry, said input signal conditioning circuitry comprising a linearity corrector means for affecting linearity correction of said klystron circuit and a further feedback circuit including a further control circuit having an input connected to said detector and an output connected to said input signal conditioning circuitry; said feedback circuit and said further feedback circuit coupled to said detector for evaluating the linearity of the output from the klystron circuit; and in response to the evaluated linearity of said klystron circuit to generate a correction signal dependent on a determined linearity, said linearity corrector means modifies said linearity of the klystron circuit in response to said correction signal.

2. Apparatus according to claim 1, wherein said linearity corrector means includes a first voltage controlled attenuator connected to the output of the first-mentioned control circuit and to a linearity corrector and a further voltage controlled attenuator connected to said linearity corrector and to the output of said further control circuit to provide said conditioning signals.

3. Apparatus according to claim 1, wherein the first-mentioned control circuit is arranged to output a control signal at a first rate and said further control circuit is arranged to output a control signal at a second rate lower than the first rate.

4. Apparatus according to claim 3, wherein said transmitter is a television signal transmitter and said first rate is a line rate and said second rate is a field rate.

* * * * *